United States Patent [19]

Werner et al.

[11] Patent Number: 4,889,090
[45] Date of Patent: Dec. 26, 1989

[54] CRANKSHAFT DRIVE OF AN INTERNAL-COMBUSTION ENGINE OF V-TYPE

[75] Inventors: Johannes Werner, Waiblingen; Walter Kerschbaum, Fellbach; Rolf Heinrich, Weinstadt, all of Fed. Rep. of Germany

[73] Assignee: Daimler-Benz AG, Stuttgart, Fed. Rep. of Germany

[21] Appl. No.: 234,931

[22] Filed: Aug. 22, 1988

[30] Foreign Application Priority Data

Aug. 22, 1987 [DE] Fed. Rep. of Germany ....... 3728014

[51] Int. Cl.$^4$ .............................................. F02B 75/32
[52] U.S. Cl. ............................ 123/197 AC; 123/55 R; 74/596
[58] Field of Search ........ 123/197 AC, 55 V, 55 VE, 123/55 VS, 55 VF, 55 R; 74/595, 596, 603

[56] References Cited

U.S. PATENT DOCUMENTS 2,780,502  2/1957  Emele ................................. 74/580
3,738,338  6/1973  Wickman ........................... 123/55 R
3,978,828  9/1976  Weber ............................... 123/55 VE

FOREIGN PATENT DOCUMENTS 2341082  2/1974  Fed. Rep. of Germany .
3541903  3/1987  Fed. Rep. of Germany .

Primary Examiner—Noah P. Kamen
Attorney, Agent, or Firm—Barnes & Thornburg

[57] ABSTRACT

The invention relates to a crankshaft drive for an internal-combustion engine of V-type having a crankshaft with two mutually offset crank pins per throw, the pins being inter-connected via a narrow intermediate element. In order to ensure an optimum axial guidance of two connecting rods mounted rotatably on the crank pins, even without an intermediate web, the intermediate element has a cross-sectional area which largely corresponds to the overlapping sectional areas of the two crank pins. Moreover, each connecting rod is guided by means of an axial stop surface arranged on the large connecting rod eye of the adjacent connecting rod.

4 Claims, 1 Drawing Sheet

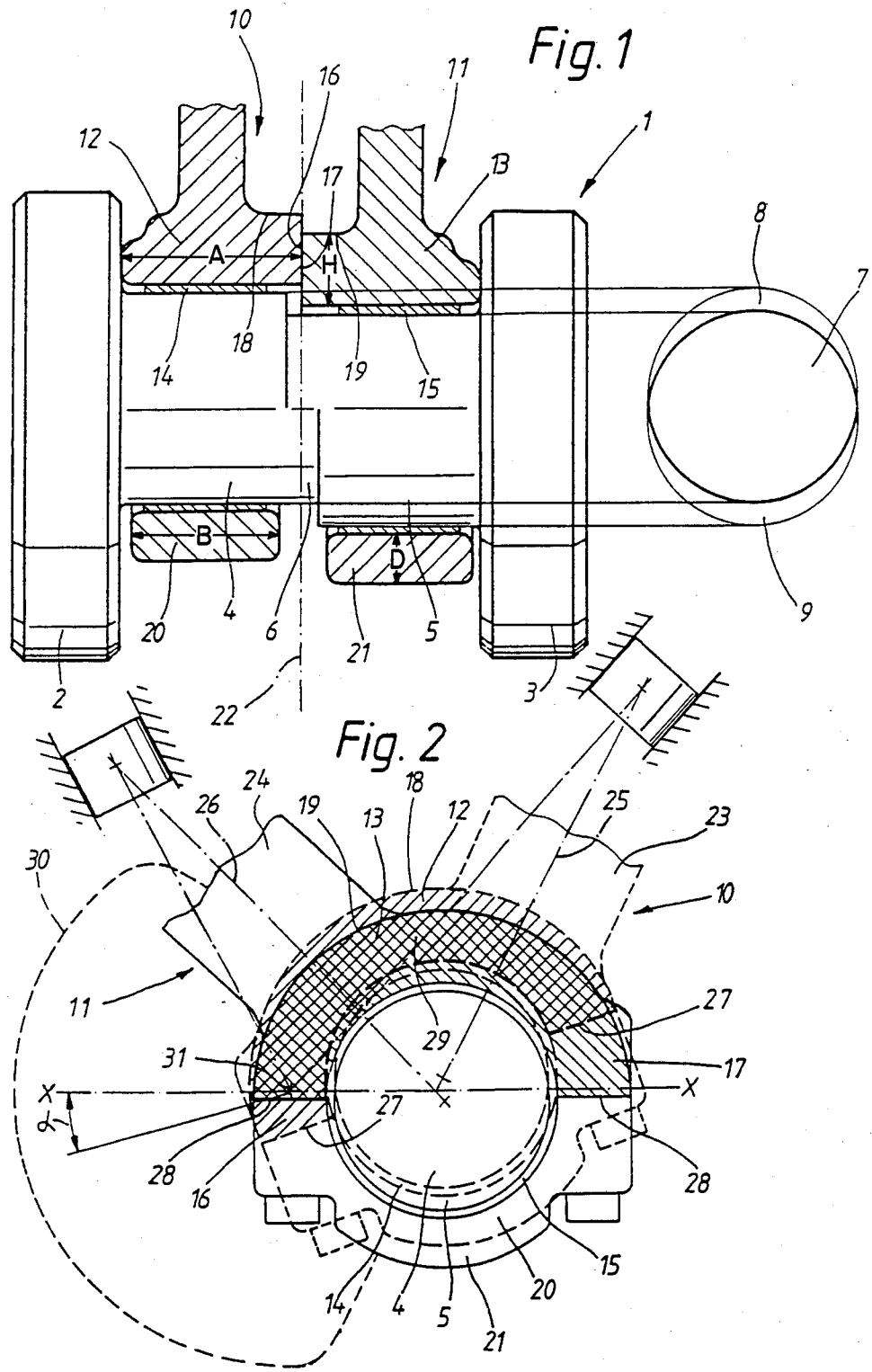

CRANKSHAFT DRIVE OF AN INTERNAL-COMBUSTION ENGINE OF V-TYPE

BACKGROUND AND SUMMARY OF THE INVENTION

The invention relates to a crankshaft drive of an internal-combustion engine of V-type which has two mutually offset crank pins per throw between pairs of crankshaft webs.

A crankshaft is known, inter alia, from German Published Unexamined Patent Application (DOS) No. 2,341,082, in which offset crank pins are interconnected via an intermediate element. However, this German application does not mention anything regarding the axial guidance of two connecting rods mounted on these crank pins.

In the case of a crankshaft drive disclosed by German Published Unexamined Patent Application (DOS) No. 3,541,903 for the attainment of a predetermined timing interval, the crank pins are arranged offset within a throw and are interconnected via a non-bearing intermediate web. In this arrangement, the intermediate web is also used as the axial guidance of both connecting rods, whereby, in contrast to throws with continuous connecting rods otherwise conventional in V-type engines, the connecting rods are also subjected on the mutually facing inner sides to a fully rotational axial contact movement, entailing increased frictional losses, with respect to the intermediate web. It is furthermore known from the U.S. Pat. No. 2,780,502 to guide two connecting rods mounted on a common crank pin axially opposite via correspondingly designed bearing shells.

Reference is also made to co-pending commonly assigned application Ser. No. 234,919, based on German Application P No. 37 28 013.9, filed in Germany on Aug. 22, 1987.

An object of the present invention is to provide a crankshaft drive of the type referred to above which reduces, as far as possible, the frictional losses caused by the axial contact of the contacting rods while at the same time retaining optimum guidance of both connecting rods.

This object is achieved according to the invention by providing an arrangement wherein each connecting rod is guided on a second side by means of an axial stop surface arranged on the connecting rod eye of an adjacent connecting rod. The width of each connecting rod eye is greater than the width of the associated crank pin in the guidance region. Further, the axial stop surfaces are so large that in every crankshaft position there is a cohesive overlapping of the two manually guided axial stop surfaces of the connecting rods.

The design of the crankshaft drive according to the invention has the effect that the two connecting rods guide each other, despite the crank pin offset. Specifically, the guidance of the connecting rods is facilitated by the two axial stop surfaces being arranged on the large connecting rod eyes, which have the axial stop surfaces formed on the outer contour so that in every crankshaft position a cohesive overlapping area of the contacts is ensured. Since each of the two connecting rod eyes is wider than the associated crank pin, the guidance plane lies at the level of the intermediate element, so that it is impossible for a protruding connecting rod eye to run on to the adjacent crank pin.

Moreover, in the case of a crankshaft drive of this design, the friction pairing of the stop surfaces is only subjected to the relative movement of the connecting rods relative to one another, which, owing to the V-shaped cylinder arrangement, consists of a reciprocating angular movement and, because of the crank of the crank pin offset, of a local translatory displacement. This results in lesser hydrodynamic losses than in the case of a full rotary contact movement of the connecting rods with double friction pairing, as is the case when an intermediate web is used.

Owing to the intermediate element, which connects the two crank pins to one another and has a cross-sectional which corresponds to the sectional area of the overlapping cross-section of two crank pins, undesired radii intersections are omitted here, so that the crankshaft is simple to produce and overly high notch stresses are avoided.

In preferred embodiments of the crankshaft drive a further saving regarding friction is obtained by an arrangement wherein, even with offset crank pins, the bearing covers are designed to be narrower that the connecting rods in the region of the large connecting rod eyes, so that they do not participate in the axial guidance and do not need to be micro-finished at the sides. With the reduction of the friction surfaces, the hydrodynamic loss, which is now only obtained from the rod-sided overlapping, is also reduced here.

An overlapping of the two axial stop surfaces in every crankshaft position, which is still cohesive despite the choice of a larger crank pin offset, is obtained in preferred embodiments of the crankshaft drive. Further, the mutual guidance of the two connecting rods is effected only via the axial stop surfaces of the bearing rod shank-sided part of the connecting rod eyes and therefore, the bearing covers are together reduced in width by the amount, to be calculated from the weight, by which the connecting rods have increased, in terms of weight, due to the radial enlargement of the axial stop surfaces. Since the bearing covers do not participate in the axial guidance, the rotating mass increase, caused by the widening of the stop surfaces arranged on the rod side, can be compensated without problem by a corresponding reduction of the bearing cover width, without the unnecessarily increasing the mass of the crankshaft drive.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic side view and shows a crankshaft drive constructed according to a preferred embodiment of the invention; and FIG. 2 is a schematic sectional view of the FIG. 1 arrangement.

DETAILED DESCRIPTION OF THE DRAWINGS

FIG. 1 shows a throw of a crankshaft used in a V-type engine. Between the two crankshaft webs 2 and 3 of the throw are arranged two crank pins 4 and 5, mutually offset by about 10°. Between the two crank pins 4 and 5, a narrow intermediate piece 6 is provided having a cross-sectional area 7 which has the form of the overlapping of cross-sectional areas 8, 9 from the two crank pin as projected in FIG. 1 (compare the schematic depiction of end view at right side of FIG. 1 and the FIG. 2 illustration).

Each of the two connecting rods 10 and 11 are rotatably mounted with their large connecting rod eyes 12 and 13 via respective plain bearing shell 14 and 15 on the crank pins 4 and 5 and are axially guided on one side by a crankshaft web 2 or 3 in each case; each of these sides having a reduced height compared to the opposite sides which are broadened. Each connecting rod eye 12, 13 has a given width A. The axial guidance of the connecting rods 10 and 11 on the other side is effected in each case by the adjacent connecting rod 11 or 10. Specifically in each case the axial guidance is achieved by means of an axial stop surface 16 or 17 arranged on the large connecting rod eye 13 or 12, the height H of the axial stop surface reaching up to the projected contour 19 or 18 of the large connecting rod eye 13 or 12 (see also FIG. 2).

The axial guidance of both connecting rods 10 and 11 is effected thereby only via the rod shank-sided part of the connecting rod eyes 12 and 13.

The two bearing covers 20 and 21 have a width B, a depth D and a predetermined density, the width B being, in contrast, of a narrower design than the width A of the connecting rod eyes 12, 13, so that even as a result of the raised axial stop surfaces 17 and 17, no additional mass is added to connecting rods 12 and 13. The width A of each connecting rod 10 or 11 in the guidance region is also greater than the width of the respective crank pin 4 or 5 carrying it, so that the guidance plane 22 extends at the level of the intermediate piece 6. In other words, the axial stop surfaces are located at midpoints 22 of the intermediate piece or element 6.

FIG. 2 shows the crankshaft drive from FIG. 1 in a side sectional view. For the sake of clarity, here in FIG. 2 the connecting rod 11, the bearing shell 15 and the crank pin 5 are represented by thin solid lines and the connecting rod 10, the bearing shell 14 and the crank pin 4 are represented by thin dashed lines.

Reference numerals 23 and 24 denote, in outline, the connecting rod shanks and hence the directions of the longitudinal axes 25 and 26 of the two connecting rods 10 and 11.

The area with lines running in one direction marks the axial stop surface 16 of the connecting rod 10 and the area with lines running in the opposite direction marks the axial stop surface 17 of the connecting rod 11.

Since the bearing covers 20 and 21 do not participate in the axial guidance of the two connecting rods 10 and 11, both axial stop surfaces 16 and 17 are delimited on the bearing cover side in each case by the junction plane 27 or 28 between the shaft-sided connecting rod eye part and the bearing cover 20 or 21.

The mutual guidance of the two connecting rods 10 and 11 is now effected via the cross-hatched overlapping region 29, at which two connecting rod eyes 12 and 13 meet each other. Since each of the axial stop surfaces 16 or 17 extend to the level of the respective connecting rod eye projected contour 18 or 19, a cohesive large-surface axial stop overlapping 29 is ensured not only for the crankshaft position shown in the drawing, but for every crankshaft angle.

Counterweights 30, arranged on the two crankshaft webs 2 and 3 to balance their masses, are arranged such that they are turned about the basic pin longitudinal axis 31 by the same angle of rotation V with respect to the main throw direction X—X (to facilitate production).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Crankshaft drive of an internal-combustion engine of V-type with a crankshaft, which has two mutually offset crank pins between two crankshaft webs in each case which are interconnected by means of a narrow intermediate element and on each of which pins a connecting rod is mounted by its large connecting rod eye having a width A, each connecting rod having first and second sides and being guidable on the first side which has a reduced height by an adjacent crankshaft web and the intermediate element having a cross-sectional area which substantially corresponds to an overlapping of cross-sectional areas of the two crank pins, wherein each connecting rod is guided on the second side by means of an axial stop surface arranged on the connecting rod eye of the adjacent connecting rod, the width A of each connecting rod eye region being greater than a width of the associated crank pin, and wherein the axial stop surfaces each have a first height so large that in every crankshaft position there is a cohesive overlapping of the axial stop surfaces of the connecting rods and wherein the axial stop surfaces each have a broadened height which extends radially across the cross-sectional area of the respective connecting rod eye.

2. Crankshaft drive according to claim 1, wherein guidance of the two connecting rods is effected only via the axial stop surfaces of a rod shank-sided part of the connecting rod eyes, and wherein bearing covers are provided for each connecting rod and have a predetermined width B less than width A of the associated large connecting rod eye of the associated connecting rod.

3. Crankshaft drive according to claim 2, wherein each of the bearing covers has a predetermined depth and density and the differences of the widths A and B times the predetermined depth and density of the bearing covers equals approximately the weight added by the broadened height of the axial stop surfaces.

4. Crankshaft drive according to claim 1, wherein said axial stop surfaces are located substantially at a midpoint of said intermediate element.

* * * * *